Oct. 2, 1934. A. L. SMITH 1,975,335
SEPARATOR
Filed July 6, 1931
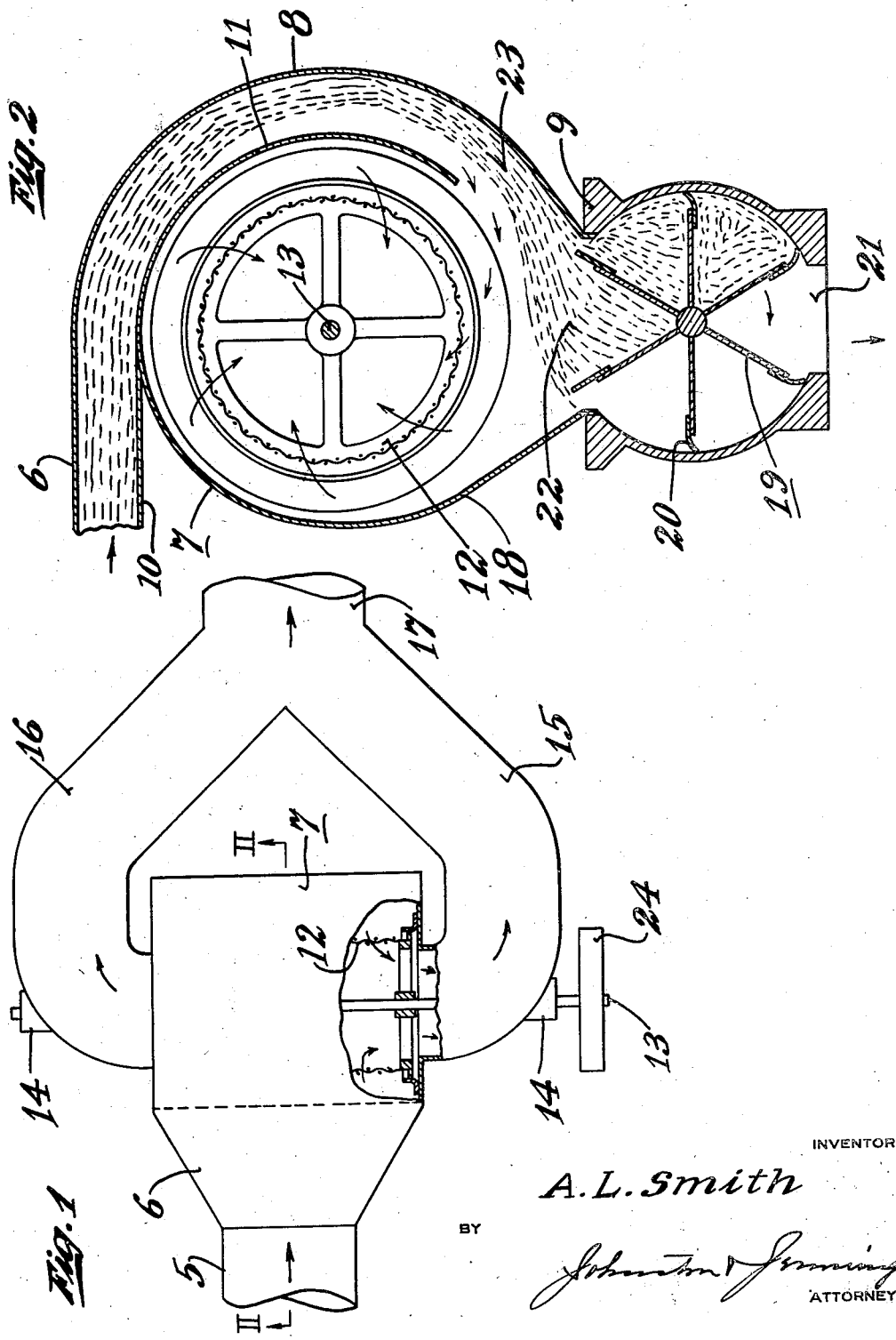
INVENTOR
A. L. Smith
BY
ATTORNEYS Patented Oct. 2, 1934

1,975,335

UNITED STATES PATENT OFFICE 1,975,335

SEPARATOR

Algernon L. Smith, Birmingham, Ala., assignor to Continental Gin Company, a corporation of Delaware Application July 6, 1931, Serial No. 548,909

10 Claims. (Cl. 19—75)

My invention relates to a separator and the like and its object is to provide a simple and effective device which will remove the cotton or other material from the air current bearing it and will feed it to the cleaning, separating, distributing or ginning machinery, as may be desired.

My invention contemplates the employment of a substantially cylindrical casing interposed in a pneumatic conveyor system, the casing having an inlet for the cotton bearing air current and being designed to produce a whirl which will cause the air and cotton to pass about the casing and under a curved partition wall therein before being discharged into the separator chamber. This wall will cause the heavier matter in suspense in the air current to collect, responsive to centrifugal force, upon the outer curved wall of the casing and to be delivered thereby directly downwardly into a rotating vacuum cotton feeder which will discharge it into the treatment machinery, while the air current is free to pass up under and about a foraminous rotating drum through which it escapes to suitable end outlets in the casing.

My invention contemplates further providing such a foraminous drum with means to rotate it counter to the direction of the entering air current, the drum being provided, preferably at each end, with a full discharge for the air current entering the separating chamber and being so spaced above and remote from contact with the feeder valve that the air current may flow freely between it and the feeder and on or about it with a vortex whirl which will make its entire foraminous circumference available for the rapid escape therethrough of the air. I thus avoid inducing at any point so rapid a radial current or flow of air as to unduly deposit thereon floating particles of cotton and the like discharged into the casing. In practice such particles of cotton as engage the drum will in due course free themselves and drop by gravity directly into the feeder.

My invention also comprises the novel details of construction and arrangements of parts, which in their preferred embodiments only are illustrated in the accompanying drawing which forms a part of this specification, and in which:—

Fig. 1 is a plan view of my improved separator.

Fig. 2 is a perspective view taken on the line II—II of Fig. 1.

Similar reference numerals refer to similar parts throughout the drawing.

In the embodiment of my invention illustrated, I show a pneumatic conveyor pipe 5 adapted to conduct cotton or other material by means of an air current and deliver it through a diverging nozzle 6 into a separator casing 7.

Fig. 2 shows the duct 6 entering at the top of the casing 7, the top wall of the duct being extended about the casing to form its outer curved wall 8 which terminates at the right hand side of the bottom vacuum feeder valve casing or body 9. The bottom wall 10 of the duct 6 is tangent to an inner arcuate partition 11 disposed parallel with the outer wall 8 and extending from end to end of the separator casing. This partition terminates at or below the bottom level of a foraminous air inlet drum 12, preferably formed of screen wire and mounted on a horizontal shaft 13 that turns in bearings 14 carried by the air outlet pipes 15 and 16 which have substantially the diameter of the drum and are concentric therewith and lead from both open ends of the drum so as to deliver the air to the suction or discharge conveyor pipe 17.

The casing has a side wall 18, corresponding to the wall 8, and extending from the inlet 10 to the left hand side of the vacuum cotton feeder body 9. The drum 12 is disposed approximately equi-distant from the walls 11 and 18, leaving an ample clearance entirely about it for the free circulation of the air currents tending to pass out of the separator through the drum into the discharge pipes 15 and 16.

Working in the body 9 is a rotating vacuum feeder 19 having its radially disposed blades provided with rubber tips 20 adapted to wipe against the body 9 and to interpose at all times a seal between the bottom discharge opening 21 for the cotton and the upper opening 22 from the body into the separator.

This feeder is disposed substantially below the drum 12 so as to leave ample space between it and the drum for the air currents to pass and flow freely around the drum as indicated in Fig. 2, and thus to have full and free access at all times to the entire circumference of the drum which is left undisturbed and unclogged by the mass of cotton which is indicated at 23 and is shown collected by centrifugal force against and moving down along the outer curved wall 8 of the separator casing.

The drum is adapted to be rotated by its pulley 24 in either direction, it being preferably rotated counterclockwise as thereby it brings any particles that may collect thereon more quickly into position which will permit them to drop off and thus maintain the drum freer of obstruction.

While the feeder may be operated in either direction it is preferable to operate it as shown clockwise, as it will present the pockets more suitably to receive the tangentially approaching layer of cotton traveling down the curved wall 8 of the casing.

The cotton or other matter to be separated from the air current fills the feeder pockets successively and is carried around and discharged through the opening 21.

In operation, having interposed the separator between the air line portions 5 and 17 in the manner described, the air current bearing the cotton enters the separator at the top and the centrifugal whirl promptly collects the cotton against the wall 8 and delivers it in a more or less compact mass into the bottom of the separator, causing it to pass directly into the compartments of the feeder 19 to be discharged, while the air current separated more or less from the cotton mass enters the casing below the bottom edge of the curved baffle wall 11 and thence flows freer between the feeder and drum and may have a vortex whirl about the entire circumference of the drum 12 free to enter through the openings or interstices of its entire circumferential wall and escape through both ends of the drum into the pipes 15 and 16 and thence return to the air line 17. A single outlet pipe 15 or 16 will serve but I get a better balanced action on the air current and preserve a gentler and more uniform inflow through the drum from the separator casing by using the two pipes.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

What I claim is:—

1. A separator for cotton carried in air currents, comprising a separator casing having an inlet adapted to deliver the air and cotton tangentially against a downwardly curving wall of the separator, a bottom vacuum feeder into which the cotton centrifugally collected on said wall is delivered directly, a rotating foraminous drum spaced substantially above said feeder to permit the free passage of the air current thereby, means in the casing to separate the mixed air and cotton from the drum, and an end discharge in said separator for the air currents passing through said drum.

2. A separator according to claim 1, in which there is provided a curved baffle under which the air current enters the working chamber of the separator at a point adjacent to its lower level.

3. In a separator for air borne cotton, a cylindrical rotary foraminous screen, a casing for the screen, a semi-cylindrical shield within the casing partially surrounding the screen and spaced substantially therefrom to form an unobstructed space completely surrounding the screen, an air and cotton inlet duct for the casing arranged tangentially thereof and radially beyond the shield, end air outlet means in the casing, and a cotton discharge means opposite the inlet duct.

4. In a separator for air borne cotton, a substantially cylindrical casing, a rotary foraminous drum in the casing, a tangential inlet means in the casing for the air borne cotton, partition means in the casing disposed to maintain the cotton out of contact with the drum around its entire periphery and to provide a free path for air entirely around the drum, end air outlet means communicating with the drum, and air sealed cotton discharge means in the casing opposite the inlet.

5. In a separator for air borne cotton, a substantially cylindrical horizontally disposed casing, a rotary foraminous drum in the casing, a tangential inlet means in the casing for the air borne cotton arranged above the drum, a partition in the casing separating the air borne cotton from the drum and extending around the drum in spaced relation thereto to a point approximately level with the lower periphery of the drum, an air sealed cotton discharge means in the casing beneath the drum, and end air outlet means communicating with the drum.

6. In a separator for air borne cotton, a substantially cylindrical horizontally disposed casing, a rotary foraminous drum mounted in the casing, means for introducing the air borne cotton tangentially into the upper part of the casing, means in the casing to separate the air borne cotton from the drum and providing a free passage of air around the drum, an air sealed discharge valve in the bottom of the casing, and end air outlet means in the casing.

7. In a separator for air borne cotton, a substantially cylindrical horizontally disposed casing, a rotary foraminous drum mounted in the casing, means for introducing the air borne cotton tangentially into the upper part of the casing, means in the casing to separate the air borne cotton from the drum and providing a free passage of air around the drum, an air sealed discharge valve in the bottom of the casing spaced substantially from the drum, and end air outlet means in the casing.

8. In a separator for air borne cotton, a substantially cylindrical horizontally disposed casing, a rotary foraminous drum mounted in the casing, means for introducing the air borne cotton tangentially into the upper part of the casing, an arcuate partition in the casing extending from the inlet around the drum in substantial spaced relation thereto to a point somewhat below the axis of the drum forming an unobstructed space around the drum and separating the stream of air and cotton from the drum, an air sealed discharge valve in the bottom of the casing, and end air outlet means in the casing.

9. In a separator for air borne cotton, a cylindrical horizontally disposed rotary foraminous screen, a casing for the screen, a bottom cotton outlet means in the casing, air sealed cotton discharge means mounted in the outlet, conduit means for delivering air borne cotton into the separator and terminating in a position to deliver said cotton in a downward direction toward the cotton outlet means and away from the screen, and air outlet means in the casing above the cotton outlet means.

10. In a cotton separator, a casing having a bottom cotton outlet and end air outlet means, air sealed discharge means mounted in the outlet for removing cotton from the casing, a rotary foraminous screen mounted in the casing above the outlet means, and downwardly directed conduit means for introducing air borne cotton into the separator and terminating in a position to deliver said cotton thereinto in a stream directed toward the discharge means and away from the screen.

ALGERNON L. SMITH.